(12) United States Patent
Nilsson et al.

(10) Patent No.: US 8,135,852 B2
(45) Date of Patent: Mar. 13, 2012

(54) DATA STREAMING SYSTEM AND METHOD

(75) Inventors: Michael E Nilsson, Ipswich (GB); Timothy R Jebb, Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 811 days.

(21) Appl. No.: 10/507,826

(22) PCT Filed: Mar. 27, 2003

(86) PCT No.: PCT/GB03/01358
§ 371 (c)(1), (2), (4) Date: Sep. 14, 2004

(87) PCT Pub. No.: WO03/084172
PCT Pub. Date: Oct. 9, 2003

(65) Prior Publication Data
US 2005/0172028 A1    Aug. 4, 2005

(30) Foreign Application Priority Data
Mar. 27, 2002 (EP) .................................. 02252224

(51) Int. Cl.
*G06F 15/16* (2006.01)

(52) U.S. Cl. ........ 709/231; 709/230; 709/232; 709/234; 709/235; 709/236

(58) Field of Classification Search ........... 709/230–236
See application file for complete search history.

(56) References Cited

U.S. PATENT DOCUMENTS

| 4,813,044 A | 3/1989 | Kumar et al. |
| 5,140,417 A | 8/1992 | Tanaka et al. |
| 5,159,447 A | 10/1992 | Haskell et al. |
| 5,363,138 A | 11/1994 | Hayashi et al. |
| RE34,824 E | 1/1995 | Morrison et al. |
| 5,511,054 A | 4/1996 | Oishi et al. |
| 5,535,209 A | 7/1996 | Glaser et al. |

(Continued)

FOREIGN PATENT DOCUMENTS
EP     0418396 A1    9/1990
(Continued)

OTHER PUBLICATIONS

Karcewicz et al., "VCEG-L27", ITU-Telecommunications Standardization Sector, Jan. 4, 2001.*
Rejaie et al., "Architectural Considerations for Playback of Quality Adaptive Video over the Internet", Proceedings of the 8th IEEE Internation Conference on Networks, p. 204, 200, ISBN:0-765-077-8.*
Sullivan et al., "Using the Draft H.26L Video Coding Standard for Mobile Applications", IEEE Image Processing 2001 International Conference.*
International Search Report dated Jun. 10, 2003 in U.S. Appl. No. 10/508,122.
Office Action dated Aug. 22, 2006 in U.S. Appl. No. 10/508,122.
Office Action dated Aug. 14, 2007 in U.S. Appl. No. 10/508,122.
Office Action dated Nov. 1, 2007 in U.S. Appl. No. 10/508,122.
Office Actin dated Feb. 20, 2007 in U.S. Appl. No. 10/508,122.
European Search Report—Oct. 11, 2002 in EP 02252216.

(Continued)

*Primary Examiner* — Emmanuel L Moise
*Assistant Examiner* — Edward Kim
(74) *Attorney, Agent, or Firm* — Nixon & Vanderhye P.C.

(57) ABSTRACT

A data streaming system and method typically use a server arranged to stream one of a plurality of encoded data streams to a client. Each of the plurality of data streams may be an independent representation of a common data source encoded at a different resolution to the other of the plurality of data streams. The server can include a transmitter and a first buffer. The transmitter can be arranged to transmit data packets of the encoded data stream to the client via the first buffer. The transmitter can be arranged to monitor the content of the first buffer and switch to transmit another of the plurality of data streams in the event that predetermined criteria are detected from the first buffer.

26 Claims, 6 Drawing Sheets

U.S. PATENT DOCUMENTS

| | | | |
|---|---|---|---|
| 5,561,466 A * | 10/1996 | Kiriyama | 375/240.25 |
| 5,566,208 A | 10/1996 | Balakrishnan | |
| 5,675,696 A | 10/1997 | Ishimoto et al. | |
| 5,706,504 A | 1/1998 | Atkinson et al. | |
| 5,748,955 A | 5/1998 | Smith | |
| 5,751,741 A | 5/1998 | Voith et al. | |
| 5,754,849 A | 5/1998 | Dyer et al. | |
| 5,818,818 A | 10/1998 | Soumiya et al. | |
| 5,822,524 A | 10/1998 | Chen et al. | |
| 5,864,678 A | 1/1999 | Riddle | |
| 5,874,997 A * | 2/1999 | Haigh | 375/240.25 |
| 5,892,881 A | 4/1999 | Takishima et al. | |
| 5,898,671 A * | 4/1999 | Hunt et al. | 370/235 |
| 5,909,434 A | 6/1999 | Odenwalder et al. | |
| 5,915,130 A | 6/1999 | Kim | |
| 5,918,020 A | 6/1999 | Blackard et al. | |
| 5,928,330 A * | 7/1999 | Goetz et al. | 709/231 |
| 5,956,321 A | 9/1999 | Yao et al. | |
| 5,960,452 A | 9/1999 | Chi | |
| 6,011,779 A | 1/2000 | Wills | |
| 6,014,694 A * | 1/2000 | Aharoni et al. | 709/219 |
| 6,014,706 A * | 1/2000 | Cannon et al. | 709/231 |
| 6,023,732 A | 2/2000 | Moh et al. | |
| 6,061,732 A | 5/2000 | Korst et al. | |
| 6,065,104 A | 5/2000 | Tng | |
| 6,081,843 A | 6/2000 | Kikki et al. | |
| 6,092,115 A | 7/2000 | Choudhury et al. | |
| 6,097,697 A | 8/2000 | Yao et al. | |
| 6,104,441 A | 8/2000 | Wee et al. | |
| 6,122,668 A | 9/2000 | Teng et al. | |
| 6,124,878 A | 9/2000 | Adams et al. | |
| 6,181,821 B1 | 1/2001 | Lim | |
| 6,216,173 B1 | 4/2001 | Jones et al. | |
| 6,226,329 B1 | 5/2001 | Ishibashi | |
| 6,269,078 B1 | 7/2001 | Lakshman et al. | |
| 6,269,978 B1 | 8/2001 | Sindoni | |
| 6,275,534 B1 | 8/2001 | Shiojiri | |
| 6,285,661 B1 | 9/2001 | Zhu et al. | |
| 6,310,857 B1 | 10/2001 | Duffield et al. | |
| 6,324,165 B1 | 11/2001 | Fan et al. | |
| 6,373,855 B1 | 4/2002 | Downing et al. | |
| 6,411,602 B2 | 6/2002 | Schoenblum et al. | |
| 6,430,620 B1 | 8/2002 | Omura et al. | |
| 6,470,378 B1 | 10/2002 | Tracton et al. | |
| 6,480,448 B1 | 11/2002 | Kawano et al. | |
| 6,480,541 B1 | 11/2002 | Girod et al. | |
| 6,487,528 B1 | 11/2002 | Vossing et al. | |
| 6,493,388 B1 * | 12/2002 | Wang | 375/240.12 |
| 6,501,797 B1 | 12/2002 | Van der Schaar et al. | |
| 6,532,242 B1 | 3/2003 | Tahara | |
| 6,573,907 B1 | 6/2003 | Mandrane | |
| 6,593,930 B1 | 7/2003 | Sheaffer et al. | |
| 6,600,737 B1 | 7/2003 | Lai et al. | |
| 6,614,843 B1 | 9/2003 | Gordon et al. | |
| 6,618,363 B1 | 9/2003 | Bahl | |
| 6,618,381 B1 | 9/2003 | Miyamoto et al. | |
| 6,625,119 B1 | 9/2003 | Schuster et al. | |
| 6,637,031 B1 | 10/2003 | Chou | |
| 6,640,086 B2 | 10/2003 | Wall | |
| 6,661,777 B1 | 12/2003 | Blanc et al. | |
| 6,697,369 B1 | 2/2004 | Dziong et al. | |
| 6,700,893 B1 | 3/2004 | Radha et al. | |
| 6,701,372 B2 | 3/2004 | Yano et al. | |
| 6,731,097 B1 | 5/2004 | Richards et al. | |
| 6,738,386 B1 | 5/2004 | Holmqvist | |
| 6,744,815 B1 | 6/2004 | Sackstein et al. | |
| 6,754,189 B1 | 6/2004 | Cloutier et al. | |
| 6,778,499 B1 | 8/2004 | Senarath et al. | |
| 6,810,425 B2 | 10/2004 | Yamamoto | |
| 6,813,275 B1 | 11/2004 | Sharma et al. | |
| 6,850,564 B1 * | 2/2005 | Pejhan et al. | 375/240.02 |
| 6,909,693 B1 | 6/2005 | Firoiu et al. | |
| 6,920,178 B1 | 7/2005 | Curet et al. | |
| 6,940,903 B2 | 9/2005 | Zhao et al. | |
| 6,993,075 B2 | 1/2006 | Kim et al. | |
| 6,993,604 B2 | 1/2006 | Dixon | |
| 7,027,516 B2 | 4/2006 | Anderson et al. | |
| 7,058,723 B2 | 6/2006 | Wilson | |
| 7,106,758 B2 | 9/2006 | Belk et al. | |
| 7,116,714 B2 | 10/2006 | Hannuksela | |
| 7,142,509 B1 | 11/2006 | Rovner et al. | |
| 7,191,246 B2 | 3/2007 | Deshpande | |
| 7,380,015 B1 | 5/2008 | Nakajima et al. | |
| 7,444,419 B2 | 10/2008 | Green | |
| 7,542,435 B2 | 6/2009 | Leon et al. | |
| 7,761,901 B2 | 7/2010 | Walker et al. | |
| 2001/0001614 A1 | 5/2001 | Boice et al. | |
| 2001/0028463 A1 | 10/2001 | Iwamura | |
| 2001/0028789 A1 | 10/2001 | Uchide | |
| 2001/0040700 A1 | 11/2001 | Hannuksela et al. | |
| 2002/0002708 A1 | 1/2002 | Arye | |
| 2002/0007416 A1 | 1/2002 | Putzolu | |
| 2002/0009096 A1 | 1/2002 | Odenwalder | |
| 2002/0010938 A1 | 1/2002 | Zhang et al. | |
| 2002/0016827 A1 * | 2/2002 | McCabe et al. | 709/213 |
| 2002/0041585 A1 | 4/2002 | Bahl | |
| 2002/0057889 A1 | 5/2002 | Ando et al. | |
| 2002/0083184 A1 * | 6/2002 | Elliott | 709/232 |
| 2002/0114292 A1 | 8/2002 | Kawabata et al. | |
| 2002/0131408 A1 | 9/2002 | Hsu et al. | |
| 2002/0131496 A1 | 9/2002 | Vasudevan et al. | |
| 2002/0165970 A1 | 11/2002 | Ludewig | |
| 2002/0167942 A1 | 11/2002 | Fulton | |
| 2003/0037158 A1 | 2/2003 | Yano et al. | |
| 2003/0072370 A1 | 4/2003 | Girod et al. | |
| 2003/0076858 A1 | 4/2003 | Deshpande | |
| 2003/0103515 A1 | 6/2003 | Brown et al. | |
| 2003/0153311 A1 | 8/2003 | Black | |
| 2003/0169932 A1 | 9/2003 | Li et al. | |
| 2003/0174609 A1 | 9/2003 | Choi | |
| 2004/0049793 A1 | 3/2004 | Chou | |
| 2004/0078460 A1 | 4/2004 | Valavi et al. | |
| 2004/0114684 A1 | 6/2004 | Karczewicz et al. | |
| 2004/0153951 A1 | 8/2004 | Walker et al. | |
| 2004/0181817 A1 | 9/2004 | Larner | |
| 2004/0190600 A1 | 9/2004 | Odenwalder | |
| 2005/0010697 A1 | 1/2005 | Kinawi et al. | |
| 2005/0021830 A1 * | 1/2005 | Urzaiz et al. | 709/234 |
| 2005/0044254 A1 | 2/2005 | Smith | |
| 2005/0120038 A1 | 6/2005 | Jebb et al. | |
| 2005/0191038 A1 | 9/2005 | Ogawa et al. | |
| 2006/0064501 A1 | 3/2006 | Harris et al. | |
| 2006/0133514 A1 | 6/2006 | Walker | |
| 2006/0171666 A1 | 8/2006 | Im | |
| 2006/0182016 A1 | 8/2006 | Walker et al. | |
| 2008/0250454 A1 | 10/2008 | Nishina et al. | |
| 2009/0116551 A1 | 5/2009 | Nilsson et al. | |
| 2009/0133075 A1 | 5/2009 | Nishina et al. | |

FOREIGN PATENT DOCUMENTS

| | | |
|---|---|---|
| EP | 0763944 A2 | 3/1997 |
| EP | 0 939 545 A2 | 9/1999 |
| EP | 1045555 A2 | 10/2000 |
| EP | 1120966 A2 | 8/2001 |
| EP | 1128610 A2 | 8/2001 |
| EP | 1130921 A1 | 9/2001 |
| EP | 1241891 A1 | 9/2002 |
| GB | 2363277 A | 12/2001 |
| GB | 2367219 A | 3/2002 |
| JP | 07-123172 | 5/1995 |
| JP | 7-236136 | 9/1995 |
| JP | 7-264580 | 10/1995 |
| JP | 7-303117 | 11/1995 |
| JP | 9-93553 A | 4/1997 |
| JP | 9-261613 | 10/1997 |
| JP | 9-298734 | 11/1997 |
| JP | 10-126771 | 5/1998 |
| JP | 10-164533 | 6/1998 |
| JP | 10-262245 | 9/1998 |
| JP | 11-164270 | 6/1999 |
| JP | 11-184780 | 7/1999 |
| JP | 11-187367 | 7/1999 |
| JP | 11-239163 | 8/1999 |
| JP | 11-308271 | 11/1999 |
| JP | 11-313301 | 11/1999 |
| JP | 2000-151705 | 5/2000 |
| JP | 2000-183958 | 6/2000 |

| | | |
|---|---|---|
| JP | 2000-228669 | 8/2000 |
| JP | 2001-144802 | 5/2001 |
| KR | 2000-28335 | 5/2000 |
| WO | WO 98/26604 | 6/1998 |
| WO | 00/01151 | 1/2000 |
| WO | WO 00/01151 | 1/2000 |
| WO | 00/35201 | 6/2000 |
| WO | 00/41365 | 7/2000 |
| WO | WO 00/41365 | 7/2000 |
| WO | WO 00/49810 | 8/2000 |
| WO | WO 00/62552 | 10/2000 |
| WO | WO 01/39508 A1 | 5/2001 |
| WO | WO 02/054776 A1 | 7/2002 |

OTHER PUBLICATIONS

International Search Report—Jul. 5, 2004 in PCT/GB2004/000974.
International Search Report—Jun. 21, 2002 in PCT/GB 01/05246.
International Search Report—May 21, 2003 in PCT/GB 03/01358.
International Search Report—Dec. 10, 2002 in PCT/GB 02/04203.
International Search Report—Dec. 27, 2002 in PCT/GB02/04182.
Office Action dated Oct. 3, 2008 in U.S. Appl. No. 10/507,111.
Office Action dated Dec. 17, 2007 in U.S. Appl. No. 10/507,111.
Office Action dated Dec. 11, 2006 in U.S. Appl. No. 10/415,819.
Office Action dated Jul. 25, 2007 in U.S. Appl. No. 10/415,819.
Office Action dated Mar. 20, 2008 in U.S. Appl. No. 10/415,819.
Office Action dated Jan. 2, 2009 in U.S. Appl. No. 10/415,819.
Office Action dated Jun. 20, 2008 in U.S. Appl. No. 10/508,122.
Office Action dated Dec. 30, 2008 in U.S. Appl. No. 10/508,122.
Office Action dated Aug. 27, 2007 in U.S. Appl. No. 10/488,345.
Office Action dated Feb. 1, 2008 in U.S. Appl. No. 10/488,345.
Office Action dated Sep. 11, 2008 in U.S. Appl. No. 10/488,345.
Office Action dated Mar. 31, 2008 in U.S. Appl. No. 10/549,582.
Office Action dated Sep. 30, 2008 in U.S. Appl. No. 10/549,582.
Postel, "Transmission Control Protocol," Prepared for Defense Advanced Research Projects Agency, Information Processing Techniques Office, 1400 Wilson Boulevard, Arlington, Virginia 22209, Jan. 1980.
Naoki Wakayama et al., "On TCP-friendly Video Transfer", IEICE Technical Report, vol. 99 No. 428, Nov. 15, 1999, pp. 79-84.
Kurceren R. et al: "Improved SP-frame Encoding. VCEG-M73." ITU Telecommunications Standardization Sector Video Coding Experts Group, Apr. 2, 2001, pp. 1-5.
Office Action dated Apr. 6, 2009 in U.S. Appl. No. 10/549,582.
Office Action dated Jun. 23, 2009 in U.S. Appl. No. 10/488,345.
Office Action dated Apr. 13, 2009 in U.S. Appl. No. 10/508,122.
Office action mailed Apr. 2, 2010 in U.S. Appl. No. 12/230,550.
Notice of Allowance mailed Mar. 12, 2010 in U.S. Appl. No. 10/549,582.
Office Action mailed Aug. 3, 2009 in U.S. Appl. No. 10/549,582.
Office Action mailed Feb. 25, 2010 in U.S. Appl. No. 10/514,819.
Interview Summary mailed Feb. 25, 2010 in U.S. Appl. No. 10/514,819.
Office Action mailed Oct. 26, 2009 in U.S. Appl. No. 10/415,819.
Office Action mailed May 28, 2010 in U.S. Appl. No. 10/488,345.
Office Action mailed Jan. 13, 2010 in U.S. Appl. No. 10/508,122.
Applicant Response (33 pgs.) to Office Action dated Jun. 23, 2009 in U.S. Appl. No. 10/488,345.
Applicant Response (10 pgs.) to Office Action dated Aug. 3, 2009 in U.S. Appl. No. 10/549,582.
Wu et al., "The core experiment on the SP frame coding," Joint Video Team (JVT of ISO/IEC MPEG & ITU-T VCEG, $2^{nd}$ meeting Geneva, CH, Jan. 29-Fev. 1, 2002, document: JVT-B112, Feb. 3, 2002, Microsoft Nokia.
Kim, et al., "Network-Aware Error Control Using Smooth and Fast Rate Adaptation Mechanism for TCP-Friendly Internet Video," IEEE, pp. 320-325 (2000).
McCanne et al., "Receiver-Driven Layered Multicast", Proc. ACM SIGCOMM '96, pp. 117-130, Palo Alto, CA, Aug. 1996.

Vicisano et al., "TCP-Like Congestion Control for Layered Multicast Data Transfer", Proc. IEEE INFOCOM '98, vol. 3, pp. 996-1003, San Francisco, CA, Mar. 1998.
Nilsson et al., "Layered Audiovisual Coding for Multicast Distribution on IP Networks", $6^{TH}$ IEEE, European Workshop on Distributed Imaging, Nov. 1999.
Walker et al., "A Study of the Efficiency of Layered Video Coding Using H.263", Proc. of Packet Video 99, The $9^{th}$ International Packet Video Workshop, New York, Apr. 1999.
Pearson, "Viewer Response to Time-Varying Video Quality", In Human, Vision and Electronic Imaging III (B.E. Rogowitz and T.N. Pappas, eds.), vol. Proc SPIE, vol. 3299 (San Jose, CA, pp. 16-25, Jan. 1998.
Ghanbari, "Two-Layer Coding of Video Signals for VBR Networks", IEEE Journal on Selected Areas of Communications, vol. 7, No. 5, pp. 771-781, Jun. 1989.
Morrison et al., "Reduction of the Bit-Rate of Compressed Video in its Coded Form", In Sixth International Workshop on Packet Video, Portland, OR, Sep. 1994.
Rejaie et al., RAP: An End-to-end Rate-based Congestion Control Mechanism for Realtime Streams in the Internet:, Proc. IEEE INFORCOM'99, 1999.
Rejaie et al., "Quality Adaptation for Congestion Controlled Playback Video over the Internet", Proceedings of ACM SIGCOMM '99, Cambridge, Sep. 1999.
Lee et al., "Retransmission Scheme for MPEG Streams in Mission Critical Multimedia Applications", EUROMICRO 1998, pp. 574-580.
Wiegand et al., "Error-Resilient Video Transmission Using Long-term Memory Motion-compensated Prediction", IEEE Journal on Selected Areas in Communications, vol. 18, No. 6, Jun. 2000, pp. 1050-1062.
Kureeren et al., "Synchronization-predictive Coding for Video Compression: The SP Frames Design for JVT/H.26L", International Conference on Image Processing, ICIP, 2002, vol. 2 of 3, pp. 497-500.
Floyd, "Connections with Multiple Congested Gateways in Packet-Switched Networks, Part 1: One-Way Traffic", ACM Computer Communications Review, vol. 21, No. 5, pp. 30-47, Oct. 1991.
Mandavi et al., "TCP-Friendly Unicast Rate-Based Flow Control", Available from http://www.psc.edu/networking/papers/tcp_friendly.html, Jan. 1997.
Allman et al., "TCP Congestion Control", Internet Engineering Taskforce Request for Comment 2581, posted on the Internet Engineering Taskforce Internet site at http://www.ietf.org/rfc/rfc2581.txt, Apr. 1999.
"DoD Standard Transmission Control Protocol", Internet Engineering Taskforce Request for Comment 761, posted on the Internet Engineering Taskforce Internet site at http://www.ietf.org/rfc/rfc761.txt, Jan. 1980.
Kurceren et al., "A Proposal for SP-Frames", ITU-T SG 16 Doc. VCEG-L27, Eibsee, Germany, Jan. 2001.
Rejaie et al., "Architectural Considerations for Playback of Quality Adaptive Video over the Internet", Proceedings of IEEE Conference on Networks, Sep. 2000.
Rejaie et al., "Layered Quality Adaptation for Internet Video Streaming", IEEE Journal on Selected Areas of Communications (JSAC), Special Issue on Internet QoS, Winter 2000.
Sisalem et al., "MDLA: A TCP-Friendly Congestion Control Framework for Heterogeneous Multicast Environments" , International Workshop on Quality of Service (IWQOS) Jun. 5, 2000, pp. 65-74.
Bolot, "Aexperience with Control Mechanisms for Packet Video in the Internet", Computer Communication Review, Association for Computing Machinery, vol. 28, No. 1, 1998, pp. 4-15.
International Search Report dated May 21, 2003.

* cited by examiner

DATA STREAMING SYSTEM AND METHOD

BACKGROUND

1. Technical Field

This application is the U.S. national phase of international application PCT/GB03/01358 filed 27 Mar. 2003 which designated the U.S. and claims benefit of EP 02252224.7, dated 27 Mar. 2002, the entire content of which is hereby incorporated by reference.

The present invention relates to a system and method suitable for streaming audio and video content over IP (Internet Protocol) networks. In particular, the present invention is suitable for use where the available bit rate is inherently variable due to physical network characteristics and/or contention with other traffic. For example, the present invention is suitable for multimedia streaming to mobile handheld terminals, such as PDAs (Personal Digital Assistants) via GPRS (General Packet Radio Service) or 3G networks.

2. Related Art

New data network access technologies such as cable and ADSL (Asymmetric Digital Subscriber Line) modems, together with advances in compression and the availability of free client software are driving the growth of video streaming over the Internet. The use of this technology is growing exponentially, possibly doubling in size every six months, with an estimated half a billion streams being served in 2000. However, user perception of Internet streaming is still coloured by experiences of congestion and large start-up delays.

Current IP networks are not well suited to the streaming of video content as they exhibit packet loss, delay and jitter (delay variation), as well as variable achievable throughput, all of which can detract from the end-users enjoyment of the multimedia content.

Real-time video applications require all packets to arrive in a timely manner. If packets are lost, then the synchronisation between encoder and decoder is broken, and errors propagate through the rendered video for some time. If packets are excessively delayed, they become useless to the decoder, which must operate in real-time, and are treated as lost. Packet loss, and its visual effect on the rendered video, is particularly significant in predictive video coding systems, such as H.263. The effect of packet loss can be reduced, but not eliminated, by introducing error protection into the video stream. It has been found that such resilience techniques can only minimise, rather than eliminate, the effect of packet loss.

In the case of a sustained packet loss, indicating a long-term drop in throughput, the streaming system needs to be able to reduce its long term requirements. This commonly means that the bit-rate of the streamed media must be reduced.

Standard compression technologies, such as H.263 and MPEG-4, can be managed to provide a multimedia source that is capable of changing its encoding rate dynamically. A video source having such properties is described herein as an elastic source, i.e. one that is capable of adapting to long-term variations in network throughput. This is commonly achieved by providing a continuously adaptive video bit-rate. This is possible because unlike audio codecs, video compression standards do not specify an absolute operating bit-rate.

Video streaming systems may be designed to provide an encoded stream with varying bit rate, where the bit rate adapts, in response to client feedback, instantly to the available network bandwidth. Such a system could be made to be network-friendly, by controlling the transmission rate such that it reduces rapidly in the case, of packet loss, and increases slowly at other times.

However, this solution is not practical for two reasons. Firstly, real-time video encoding usually requires a large amount of processing power, thus preventing such a solution from scaling to support many users. Secondly, the end-user perception of the overall quality will be adversely affected by rapid variations in instantaneous quality.

For uni-directional streaming applications, the delay between the sender and receiver is only perceptible at start-up. Therefore, common techniques trade delay for packet loss and jitter. Provided the average throughput requirements of the video stream match the average available bandwidth the receiver buffer size can be dimensioned to contain the expected variation in delay.

Market-leading streaming systems are believed to use significant client-side buffering to reduce the effects of jitter that may be encountered in the Internet. While this helps, it also introduces large start-up delays, typically between 5 and 30 seconds, as the buffer fills. These systems also include technologies that allow the client to adapt to variations in available bandwidth. Although the details of these techniques are not publicly available, it is suspected that they generally use multi-data rate encoding within single files (SNR scalability), and intelligent transmission techniques such as server-side reduction of the video picture rate to maintain audio quality. Such large amounts of buffering could conceivably allow a significant proportion of packets to be resent, although these re-transmissions themselves are subject to the same network characteristics. The decision to resend lost data is conditional on this and several other factors. Such techniques are generally only applicable to unicast transmissions. Multicast transmission systems are typically better served by forward error correction or receiver-based scalability such as RLM and RLC. S. McCanne, 'Receiver driven layered multicast', Proceedings of SIGCOMM 96, Stanford. Calif. August 1996. L. Vicisano, L. Rizzo and J. Crowcroft, 'TCP-like congestion control for layered multicast data transfer', Infocom '98.

The use of a buffer as described above allows a system to overcome packet loss and jitter. However, it does not overcome the problem of there being insufficient bit rate available from the network. If the long term average bit rate requirements of the video material exceeds the average bit rate available from the network, the client buffer will eventually be drained and the video renderer will stop until the buffer is refilled. The degree of mismatch between available network bit rate and the rate at which the content was encoded determines the frequency of pausing to refill the buffer.

As described above, most video compression algorithms, including H.263 and MPEG-4, can be implemented to provide a continuously adaptive bit rate. However, once video and audio have been compressed, they become inelastic, and need to be transmitted at the encoded bit-rate.

Whilst network jitter and short term variations in network throughput can be absorbed by operating a buffer at the receiver, elasticity is achieved only when long-term variations in the network throughput can also be absorbed.

Layered encoding is a well-known technique for creating elastic video sources. Layered video compression uses a hierarchical coding scheme, in which quality at the receiver is enhanced by the reception and decoding of higher layers, which are sequentially added to the base representation. At any time, each client may receive any number of these video layers, depending on their current network connectivity to the source. In its simplest implementation, this provides a coarse-grain adaptation to network conditions, which is advantageous in multicast scenarios. Layered video compression has also been combined with buffering at the client, to add fine-grain adaptation to network conditions. However, it has been shown that layered encoding techniques are inefficient, and will typically require significantly more processing at the client which causes particular problems when dealing with mobile devices, which are likely to have reduced processing capability.

Transcoding is another well-known technique for creating elastic video sources. It has been shown that video transcoding can be designed to have much lower computational complexity than video encoding. However, the computational complexity is not negligible, and so would not lead to a scalable architecture for video streaming.

BRIEF SUMMARY

According to one aspect of the present invention, there is provided a data streaming system comprising a server arranged to stream one of a plurality of encoded data streams to a client, each of the plurality of data streams being an independent representation of a common data source encoded at a different resolution to the other of the plurality of data streams, the server comprising a transmitter and a first buffer, the transmitter being arranged to transmit data packets of the encoded data stream to the client via the first buffer, wherein the transmitter is arranged to monitor the content of the first buffer and switch to transmit another of the plurality of data streams in the event that predetermined criteria are detected from the first buffer.

Some of the key attributes of the overall exemplary system are:

- varying the transmission rate in a network-friendly manner;
- decoupling of the transmission rate from the media encoding rate;
- building up a buffer of data at the client without incurring a start-up delay;
- smoothing short term variations in network throughput by use of client buffering;
- adjusting long-term average bandwidth requirements to match the available resources in the network by switching between multimedia streams encoded at different bit rates; and
- providing resilience to packet loss by selectively retransmitting lost packets, without affecting the quality perceived by the user, by use of client buffering.

The present exemplary embodiment permits scaling the transmission bit rate of the compressed video in dependence on changing network conditions.

In the present exemplary embodiment a produced audio-visual stream does not have to be transmitted at a single fixed bit rate, thus allowing transmission at whatever rate the network instantaneously supports. Resilience to transmission losses is provided by building a buffer of data at the receiver, to allow time for lost data to be retransmitted before it is needed for decoding and presentation.

The present invention permits scaling the transmission bit rate of the compressed video in dependence on changing network conditions.

In the present invention, a produced audio-visual stream does not have to be transmitted at a single fixed bit rate, thus allowing transmission at whatever rate the network instantaneously supports. Resilience to transmission losses is provided by building a buffer of data at the receiver, to allow time for lost data to be retransmitted before it is needed for decoding and presentation.

At any one time, only one video stream and one audio stream from a hierarchy of such streams are transmitted to a client. This is implemented in the form of a combination of so called "simulcast switching" for coarse-grain adaptability, and transmission rate variation for fine-grain adaptation.

The system has been shown to perform well over a GPRS network, making good use of the available network bandwidth, to provide satisfactory multimedia quality.

The system has been designed to overcome the characteristics of IP networks, and in particular mobile IP networks, to provide users with multimedia of consistent quality with minimal start-up delay.

The transmitter may be arranged to determine the amount of data buffered at the client from the content of the first buffer, wherein the predetermined criteria include a predetermined level of data determined to be buffered at the client. A data packet may be removed from the first buffer upon acknowledgement by the client of receipt of the packet. The transmitter may be arranged to determine the amount of data buffered at the client in dependence on the latest data packet removed from the first buffer and on an estimation of number of packets decoded by the client.

The first buffer may include a mirror buffer storing data on packets in the first buffer, the transmitter being arranged to monitor the content of the first buffer using the data in the mirror buffer.

Data packets may be transmitted to the client using an extended TPKT protocol, the data packets including a header containing a decoding timestamp and a data stream identifier.

The system may further comprise a plurality of transmitters, each communicating with a respective client via a respective first buffer to transmit one of the plurality of data streams determined in dependence on respective predetermined criteria.

The data stream may be encoded video data.

The transmitter may be arranged to multiplex audio packets and video packets within the transmission of data packets. Neighbouring audio and video packets may represent audio and video information that is intended for representation at substantially the same time.

The data stream may be encoded audio data.

The resolution may be an encoding bit rate of the data.

The server may include an encoder arranged to accept a data feed and encode the data feed into the plurality of encoded data streams.

The system may further comprise a plurality of buffers, wherein the encoder is arranged to output each encoded data stream into a respective one of the plurality of buffers, the transmitter being arranged to obtain data packets for a respective data stream from its respective one of the plurality of buffers.

The server may include a file source storing the plurality of encoded data streams.

According to another aspect of the present invention, there is provided a data streaming system comprising a client and a server, the server being arranged to stream one of a plurality of encoded data streams to the client, each of the plurality of data streams being an independent representation of a common data source encoded at a different resolution to the other of the plurality of data streams, the server comprising a transmitter and a first buffer and the client including a receiving buffer, wherein the transmitter is arranged to transmit data packets of the encoded data stream to the client via the first buffer, wherein the client is arranged to store received data packets in the receiving buffer and to acknowledge receipt to the server, wherein the transmitter is arranged to delete packets from the first buffer when an acknowledgement receipt is received, the server being arranged to switch to another of the plurality of data streams in the event that predetermined criteria are satisfied, the predetermined criteria comprising analysis on content of the first buffer.

The packets may include packet sequence data, the client being arranged to request retransmission of non-received packets based on the sequence data, the server being arranged to retransmit a packet from the first buffer upon receipt of a retransmission request.

According to a further aspect of the present invention, there is provided a method of streaming one of a plurality of encoded data streams to a client, each of the plurality of data streams being an independent representation of a common data source encoded at a different resolution to the other of the plurality of data streams, the method comprising the steps of:
transmitting data packets of the encoded data stream to the client via a first buffer;
monitoring the content of the first buffer; and,
switching to transmit another of the plurality of data streams in the event that predetermined criteria are detected from the first buffer.

The plurality of data streams may each be encoded at a different bit rate, the method further comprising the step of initially transmitting data packets of the lowest bit rate data stream.

The predetermined criteria may include an amount of data determined to be buffered at client.

The predetermined criteria may include one or more network throughput thresholds.

Network throughput may be calculated by the steps of:
counting the number of bytes passed to the first buffer;
subtracting the counted number of bytes from the size of the first buffer, and,
dividing the result by the time since the start of transmission.

The method may further comprise the step of measuring network throughput over more than one interval to determine throughput variation.

The predetermined criteria may include determination of network throughput sufficient to sustain the other of the plurality of the data streams.

The method may further comprise the step transmitting data at a maximum rate irrespective of an amount of data buffered at the client, wherein the predetermined criteria include network throughput determined at the maximum rate.

The data streams may be encoded as a series of pictures predictively encoded in dependence on the previous pictures in the data stream, the data streams including quantised source access pictures interspersed at predetermined periods in the picture series, wherein the method of encoding the quantised source access pictures including the steps of:
encoding picture as a predicted picture; and,
if no information about an area of a picture is indicated in the encoded predicted picture, setting the quantiser index to a fine quantisation value when encoding as a quantised source access picture.

BRIEF DESCRIPTION OF THE DRAWINGS

Examples of the present invention will now be described in detail, with reference to the accompanying Figures, in which.

DETAILED DESCRIPTION OF EXEMPLARY EMBODIMENTS

Figure 1:
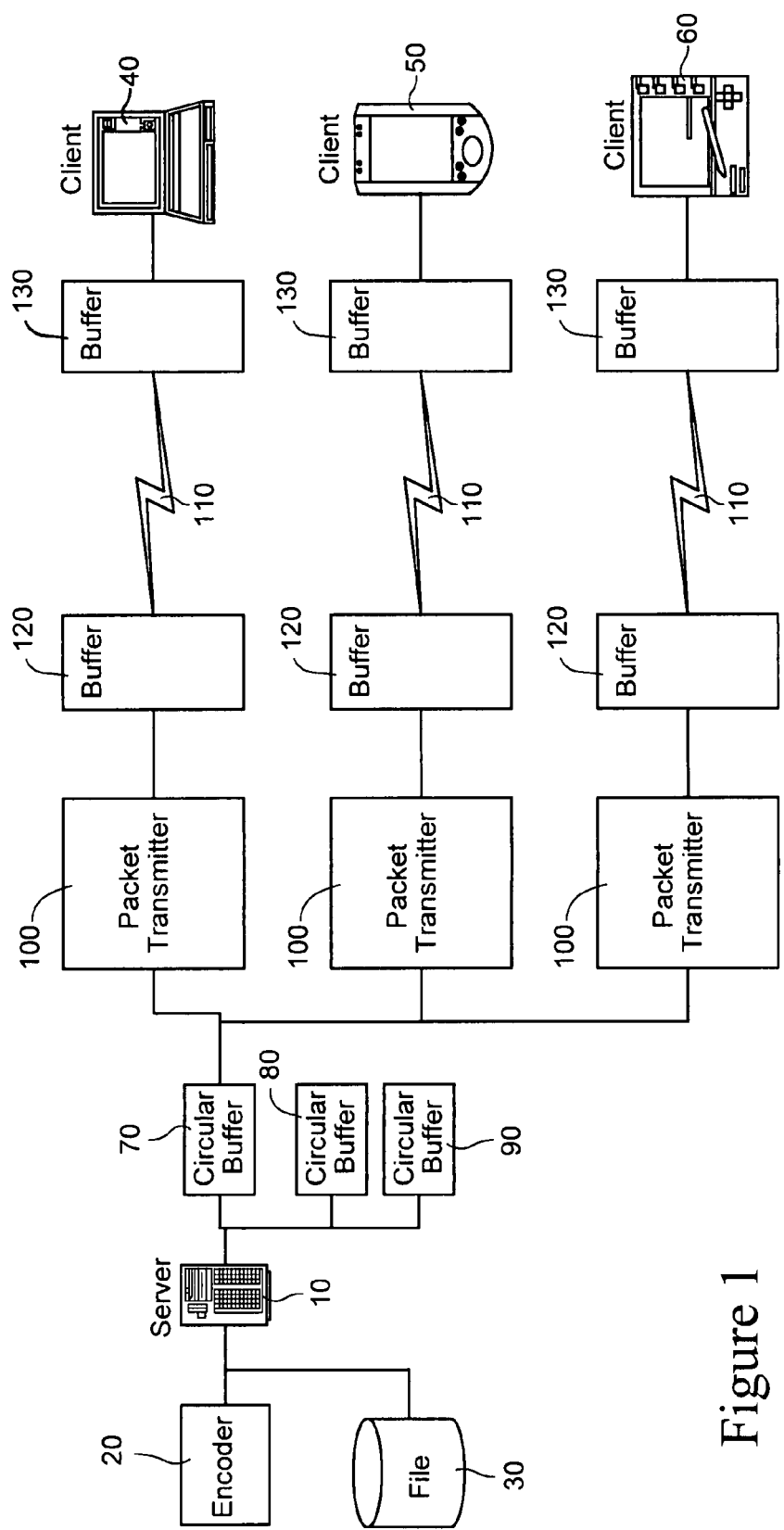
FIG. 1 is a schematic diagram of an audio-visual data streaming system in accordance with an embodiment of the present invention.

FIG. 1 is a schematic diagram of an audio-visual data streaming system in accordance with an exemplary embodiment of the present invention.

The server 10 receives encoded multimedia content either directly from an encoder 20 or from a file 30, and serves this content to one or more clients 40-60. The server 10 scales to support many clients 40-60 accessing many pieces of content independently as it performs little processing, just selecting packets for onward transmission. No encoding or transcoding of media is performed in the server 10.

In principle, the server 10 operates in the same way for both live streams, provided from the encoder 20, and for pre-encoded streams from the file 30. In this particular embodiment, streaming of live media is described. Differences in streaming media from pre-encoded files are discussed in later embodiments.

The server 10 includes a number of circular buffers 70-90. For each client 40-60 there is one instance of a packet transmitter 100. The packet transmitter 100 determines when and from which buffer 70-90 the next packet is read, reads the chosen packet and sends it to the respective client over a network connection 110.

A semi-reliable network connection 110 is required from the server 10 to each respective client 40-60 to ensure that almost all packets sent are received, therefore minimising disturbances to user-perceived quality. Buffers (120, 130) are therefore used at the respective ends of the network connection 110 to allow retransmissions of lost packets. The network connection 110 is also desired to be network friendly, that is, to allow the bit rate used to be increased when congestion is not experienced, and to be drastically reduced when congestion occurs.

Whilst the system components are illustrated and described as a combination of integrated and separate components, it will be appreciated that different configurations could be used. For example, an external encoder 20 and/or file store 30 could be used. Equally, the buffers 130 are likely to be integral to the client devices 40-60.

Figure 2:
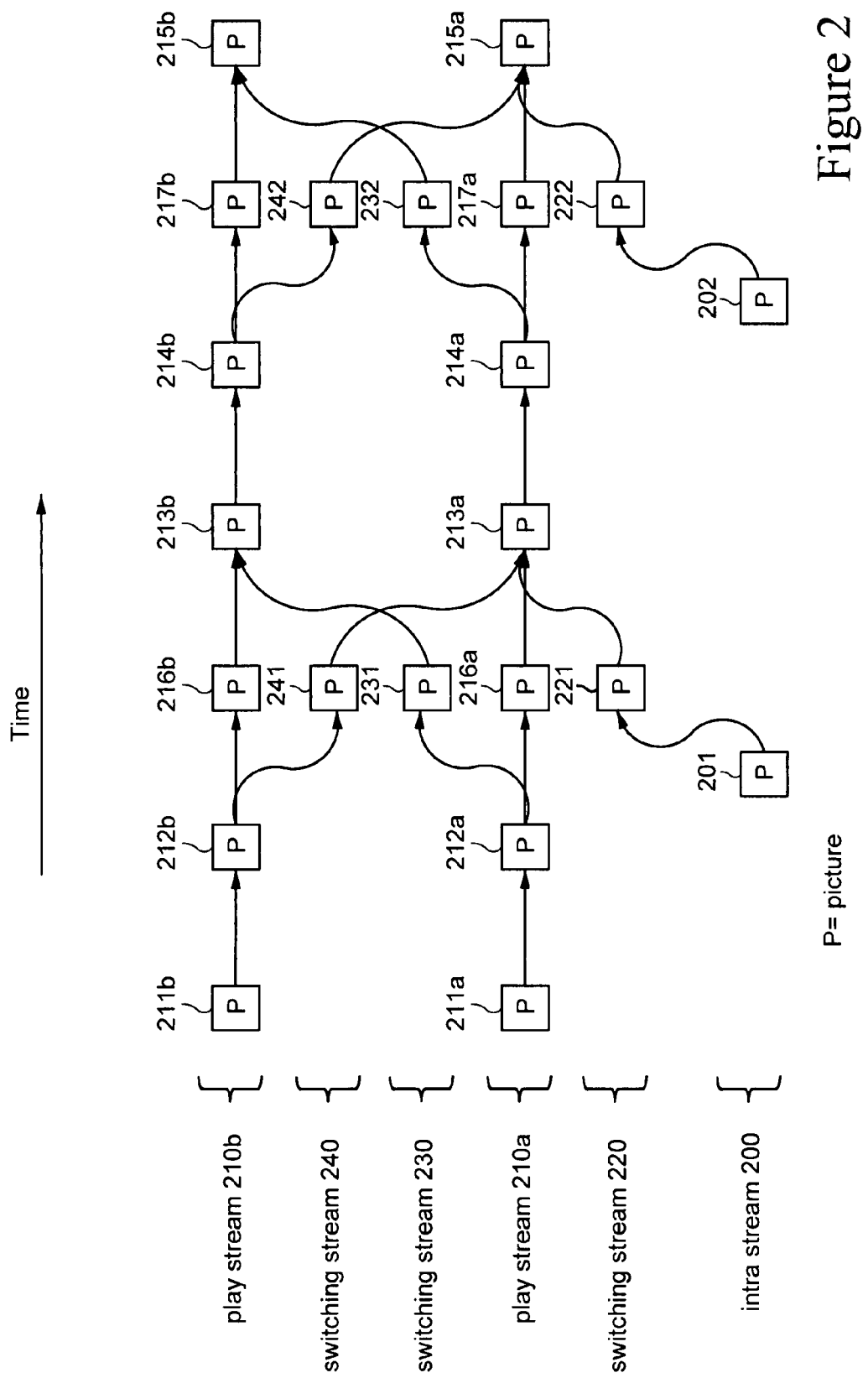
FIG. 2 is a schematic diagram of a video encoding hierarchy used in the system of FIG. 1.

FIG. 2 is a schematic diagram of a video encoding hierarchy used in the system of FIG. 1. The encoder 20 encodes live or stored multimedia content into an elastic encoded representation. Audio is encoded at low bit rate into a single encoded bit stream, and hence is in itself inelastic. However, as audio typically requires a smaller bit rate than video, provided the video is encoded in an elastic fashion, then the combined encoding of audio and video can be considered to be elastic.

Audio is encoded using the AMR (Adaptive Multi-Rate) encoder at 4.8 kbit/s. Video is encoded into an elastic representation. In a manner similar to layering, the encoder 20 creates a hierarchy of independent video streams. Instead of building this hierarchy by making each stream dependent on all streams lower in the hierarchy, each stream is encoded independently. Such a hierarchy is well-known, being referred to as 'simulcast'.

Although audio data has been described as being encoded using a low bit rate AMR scheme, other AMR encoding rates, and other encoding standards such as MP3, could also be supported. Encoded audio at various rates could be organised in a hierarchy of independent streams in a similar manner to that described below for video, but with the simplification of switching between encoded representations from the fact that each audio frame is typically coded independently.

The video hierarchy, created using an extension to the ITU-T standard H.263, includes an intra stream 200, to allow random access to video streams, and one or more play streams 210a, 210b, for ordinary viewing of the content. Each play stream 210a, 210b is encoded at a different bit rate, thus allowing a given client 40-60 to receive at a rate appropriate for its current network connection 110 to the server 10. The hierarchy also contains switching streams 220, 230, 240 which allow switching from the intra stream 200 to the lowest rate play stream 210a, and between play streams.

Since the encoding algorithms employ motion-compensated prediction, switching between bitstreams at arbitrary points in a play stream, although possible, would lead to visual artifacts due to the mismatch between the reconstructed frames at the same time instant of different bit streams. The visual artifacts will further propagate in time.

In current video encoding standards, perfect (mismatch-free) switching between bit streams is possible only at the positions where the future frames/regions does not use any information previous to the current switching location, i.e., at access pictures. Furthermore, by placing access pictures at fixed (e.g. 1 sec) intervals, VCR functionalities, such as random access or "Fast Forward" and "Fast Backward" (increased playback rate) for streaming video content, are achieved. A user can skip a portion of video and restart playing at any access picture location. Similarly, increased playback rate, i.e., fast-forwarding, can be achieved by transmitting only access pictures.

It is, however, well known that access Pictures require more bits than the motion-compensated predicted frames. Thus, the intra stream 200 and switching streams 220, 230, 240 are used. The main property of switching streams is that identical pictures can be obtained even when different reference frames are used.

The main purpose of the hierarchy is to allow the server 10 to transmit a play stream 210a or 210b to a client 40-60 to achieve an optimal balance between building up a buffer of received data at the client 40-60 to provide resilience to packet loss and sudden drops in network throughput, and providing the best play stream 210a or 210b to the client 40-60 depending on the highest bit rate that its network connection 110 instantaneously supports.

The intra stream 200 is a series of intra coded pictures (201, 202) that are used to provide random access and recovery from severe error conditions. The play streams 210a, 210b include predictively coded pictures (211a, 212a, 213a, 214a, 215a; 211b, 212b, 213b, 214b, 215b) which may be bi-directionally predicted, and may be predicted from multiple reference pictures. The play streams 210a, 210b also include periodic access Pictures 216a, 217a; 216b, 217b. The switching streams 220, 230, 240 consist of a series of linking Pictures (221, 222; 231, 232; 241, 242).

The circular buffers 70-92 are designated for each stream type, one for each intra (70), play (80, 85) and switching (90, 91, 92) stream for each piece of content When a client 40 first connects to the server 10, the server 10 locates an appropriate intra picture (for example, intra picture 201) from the circular buffer 70 storing the intra stream, and sends this to the client 40. The server 10 then selects the linking picture (221) to switch from the intra stream 220 to the play stream 210a with the lowest encoding bit rate, and then continue to serve from that play stream (213a onwards).

The transmission of packets to the client 40 is an independent process, with the rate of transmission depending on the state of the network and the transmission protocol used. However, the intention is that initially the transmission rate is greater than the encoding bit rate of the play stream 210a with the lowest encoding bit rate. This will allow the client 40 to start decoding and presenting media to the user immediately at the point that data is received and decoded, while also allowing the client 40 to build up excess compressed media data in its decoding buffer.

At the point where an access picture (such as access picture 217a in the above example), the client 40 and/or server 10 may determine that a different play stream is more suitable (for example due to increased or decreased network capacity). In the above example, switching from the low rate play stream 210a to the higher rate play stream 210b is accomplished by the server 10 transmitting the link picture 232 instead of access picture 217a. The link picture 232 links to play stream picture 215b of the higher rate play stream 210b allowing the client 40 to receive that play stream. Switching to a play stream of decreased bit rate is accomplished in a similar manner.

Three methods of encoding linking pictures have been investigated. Each method provides different compromises between the accumulation of drift from switching, the cost in terms of bit rate of the actual switching, and the impact on the quality of the individual play streams caused by encoding regular pictures of a type that allow drift-free low bit rate switching.

1. Predictively coded linking pictures

In the first method, linking pictures are generated as Predicted pictures. They are coded in a manner such that when reconstructed they are similar, in the sense of having for example a small mean square difference, to the reconstruction of the simultaneous access picture in the destination play stream. Access pictures can be coded as Predicted pictures. The number of bits used to encode the linking pictures determine how well matched the reconstructed linking picture is to the reconstructed access picture, and hence determines the amount of drift that would occur as a result of switching. However, drift will accumulate on each occurrence of switching.

2. Intra coded linking pictures

In the second method, linking pictures are generated as intra pictures. They are coded in a manner such that when reconstructed they are similar, in the sense of having for example a small mean square difference, to the reconstruction of the simultaneous access picture in the destination play stream. Access pictures can be coded as Predicted pictures. The number of bits used to encode the linking pictures determines how well matched the reconstructed linking picture is to the reconstructed access picture, and hence the amount of drift that would occur as a result of switching. However, for a given amount of mismatch, an intra coded linking picture would usually require many more bits than a predictively coded linking picture. The use of intra coding for linking pictures prevents the accumulation of drift.

3. Quantised-Source coded linking pictures

In the third method, linking pictures are coded with a technique based on the concept described in "VCEG-L27, A proposal for SP-frames, submitted by Marta Karczewicz and Ragip Kurceren at the ITU-Telecommunications Standardization Sector Video Coding Experts Group's Twelfth Meeting: Eibsee, Germany, 9-12 January, 2001, available at ftp://standard.pictel.com/video-site/" referred to herein as Quantised-Source pictures.

Figure 3:
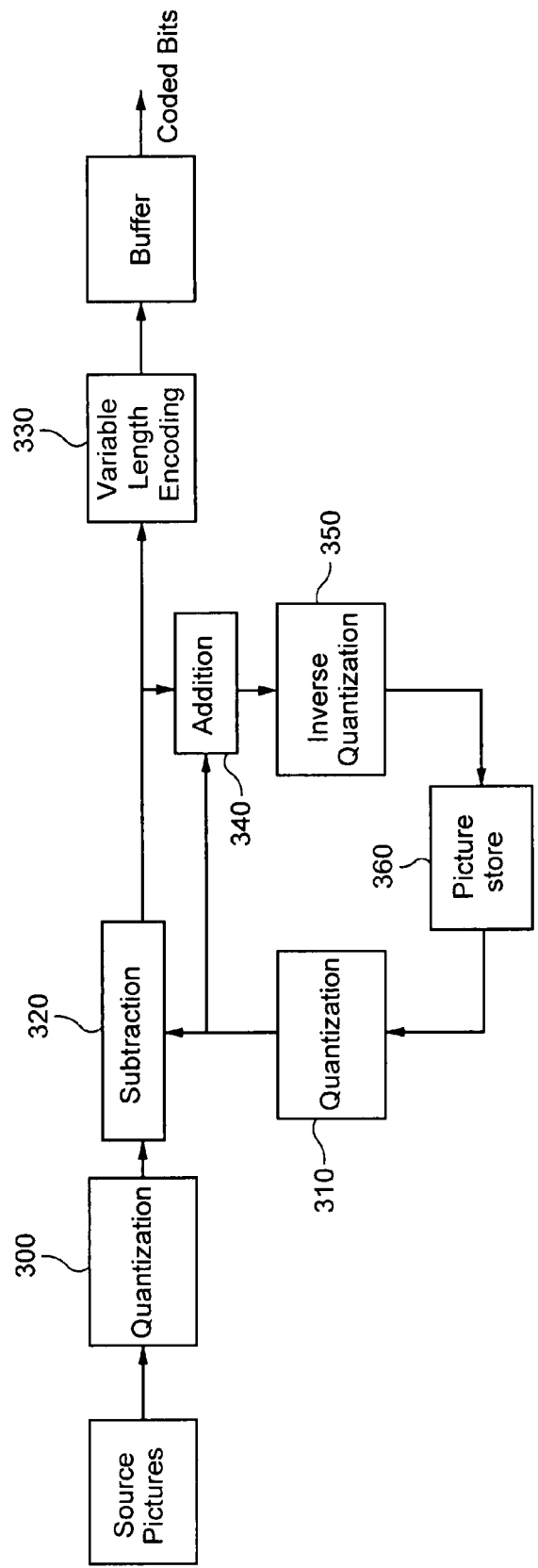
FIG. 3 is a schematic diagram of a video encoding architecture that allows mismatch free switching between video streams to be achieved.

The encoding architecture for Quantised-Source pictures is shown in FIG. 3. The source picture and the motion compensated prediction are independently quantised in steps 300 and 310 respectively, with the same quantiser index, and transformed, before being subtracted in step 320 and variable length encoded in step 330. The reconstructed picture is formed by adding, in step 340, the output of subtractor 320 and the output of quantisation and transformation 310, and inverse transforming and inverse quantising the result in step 350. The reconstructed picture is stored in Picture Store 360. The result is that the reconstructed picture is simply the quantised source picture, and is independent of the motion compensated prediction. Hence a given source picture can be reconstructed identically when predicted from different reference pictures, and hence drift free switching is enabled. The motion compensated prediction is not irrelevant, as it reduces the entropy of the signal to be variable length encoded and hence reduces the number of bits produced by encoding a picture.

Access pictures are also coded as Quantised-Source pictures, with an identical selection of coding modes, intra or inter, and quantiser choice, as the linking picture. This ensures that the linking picture reconstructs identically to the simultaneous access picture in the destination play stream.

The number of bits required to encode the linking pictures is determined by the encoding of the corresponding access picture. The number of bits used to encode the access picture depends on how the quantisation is performed, but in general is more than the number of bits used to encode Predicted pictures and less than the number of bits used to encode Intra pictures. This is because encoding is more efficient than intra encoding due to the use of prediction, but not as efficient as normal prediction due to the quantisation of the prediction error. Hence the use of Quantised-Source pictures allows drift free switching but at the expense of less efficient encoding of the play stream.

Quantised-Source pictures are encoded with the same H.263 syntax as predicted pictures, with the exception that they are distinguished from predicted pictures by setting the first three bits of MPPTYPE to the reserved value of "110".

The periodic encoding of Quantised-Source pictures can cause a beating effect in stationary areas of pictures. This is explained as follows. In normal predictive coding, stationary areas of the picture which have already been encoded as a reasonable representation of the source picture are not modified. In the encoding of such areas in Quantised-Source pictures, the prediction must be quantised, and if done with the quantiser index used for non-stationary areas of the picture, makes the region change, possibly making it worse, but in any case, changing it. This changing is the beating effect.

This is overcome by noting that when the prediction for an area of the picture provides a good enough representation of the source, there is no need to transmit information, and hence change the area So when an access picture is encoded as a Quantised-Source picture, a test is performed to determine whether information about the area would have been transmitted if the picture had been encoded as a Predicted picture rather than a Quantised-Source picture. If no information would have been transmitted, the quantiser index used by the quantisation of steps 300 and 310 and inverse quantisation of step 350 is set to a small value, the output of subtractor 320, commonly known as the prediction error, is set to zero, thus this area of the newly reconstructed picture is equal to the corresponding area of the previous reconstructed picture quantised with a fine quantiser. In H.263 and other standards, the range of quantiser index is from 1 (fine) to 31 (coarse). By referring to a small index, a value typically of 8 or less is meant. This minimises unnecessary changes to the reconstructed picture while minimising the amount of information that must be transmitted. There will however be a cost in bit rate in the corresponding linking picture, where the prediction error is unlikely to be zero, but the same fine quantiser must be used.

Figure 4:
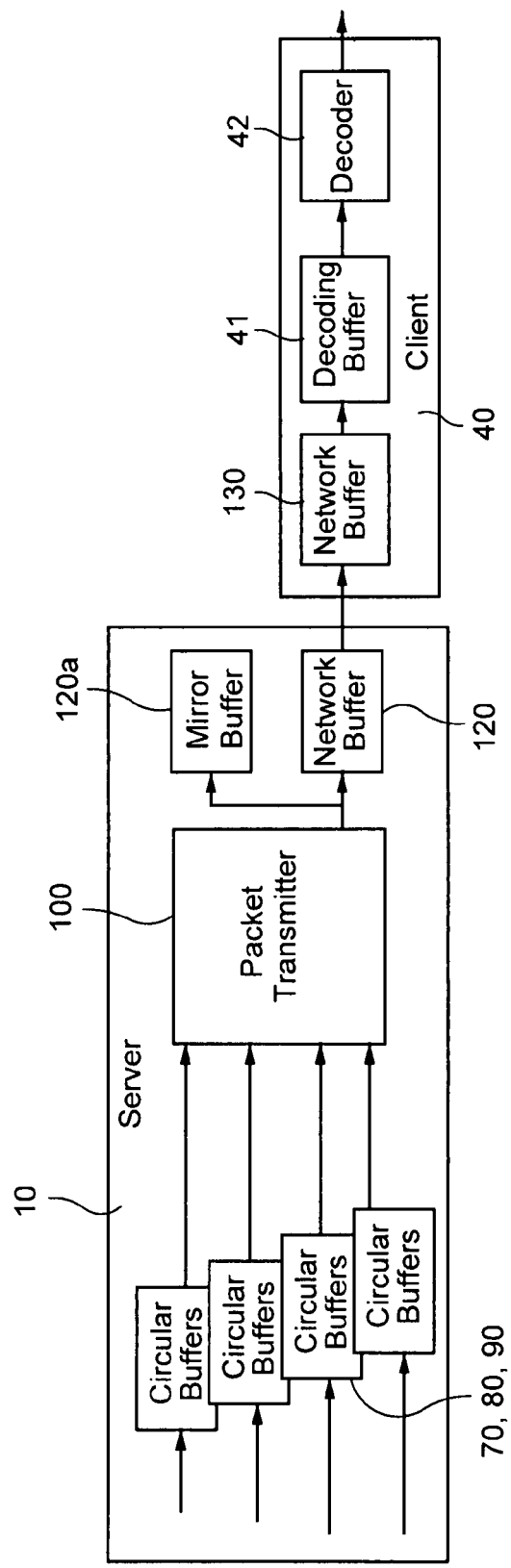
FIG. 4 is a schematic diagram of a client-server architecture suitable for use in the system of FIG. 1.

FIG. 4 is a schematic diagram of a client-server architecture suitable for use in the system of FIG. 1.

The client 40 includes a network buffer 130, a decoding buffer 41 and a decoder 42. The server 10 includes circular buffers 70, 80, 90 as discussed above, and a packet transmitter 100 and network buffer 120 for each client.

The client 40 keeps the server 10 informed of the amount of information in its decoding buffer 41 and the rate at which it is receiving data. The server 10 uses this information to determine when to switch between play streams. For example, when the client 40 has accumulated more than a threshold of data, say 15 seconds of data in its decoding buffer 41 and the client 40 is receiving at a rate greater than or equal to the encoding rate of the next higher play stream in the hierarchy, the server 10 can switch the client's packet transmitter 100 to the next higher slay stream at the next linking picture.

Similarly, when the amount of data accumulated by the client 40 in its decoding buffer 41 falls to less than a threshold, the server 10 can switch the client's packet transmitter 100 to the next lower play stream at the next linking picture.

The overall effect is that the transmission rate varies in a network-friendly fashion according to the state of congestion in the network, but due to the accumulation of data in the client's decoding buffer 41, the user perceives no change in quality as a result of short term changes in transmission rate. Longer term changes in transmission rate are handled by switching to a stream with a different encoding rate, to allow increased quality when the network allows it, and to reduce quality, without stalling presentation or presenting corrupted media to the user, when the network throughput drops.

The decoding buffer 41 at the client is used to reduce the impact of network performance variations on the quality of media presented to the user. The network characteristics that the buffer is designed to handle fall into three categories: packet jitter, packet loss and variable throughput. In practice these three network characteristics are not independent, all being associated with network congestion, and in the case of mobile networks, with degradation at the physical layer.

By de-coupling the transmission fate from the media encoding rate, the client's decoding buffer 41 can be filled when network conditions are favourable, to provide resilience for times when network conditions are not so good.

The accumulation of tens of seconds of data in the decoding buffer 41, allows packet jitter (delay variations) of the same magnitude to be masked from the user. In practice this masks all packet jitter, as larger amounts of jitter are better classified as temporary connection drop-outs, which are handled by the error recovery process described below.

By accumulating data in the decoding buffer 41, time is available for the retransmission of lost packets before they are needed for decoding. Again, by dimensioning the decoder buffer 41 to contain more data than some multiple of the round trip delay, there is time for a small number of retransmission attempts to recover from packet loss. This allows recovery from most instances of packet loss without affecting decoded media quality, and makes the connection semi-reliable.

Finally, again by accumulating data in the decoding buffer 41, the client 40 can sustain consistent media quality for some time when the receiving bit rate is less than the encoding bit rate, and for some time when the receiving rate has dropped to zero.

As the data is streamed to the client 40 at a rate independent of the encoding rate, and buffered in the decoding buffer 41, it is necessary for decoding of data to be correctly timed, rather than simply to decode and present as fast as possible. Timestamps are used for this purpose, as well as for the synchronisation of audio and video.

Due to network variations, the amount of data in the client's decoding buffer 41, measured in bytes, may vary with time. In addition, the amount of data in the decoding buffer 41, measured in terms of the length of media presentation time it represents, would also vary with time. This has implications for streaming of live content: it is not possible to build up data in the decoding buffer 41 if the first data sent to the client 40 is sent with minimal delay from the time it was captured and encoded. Hence, the first data that is sent to the client 40 must be old data, that is, data representing events that took place some time before the client 40 connected to the server 10. Then as the decoding buffer 41 fills, the most recent data in it becomes more and more recent, while the media presented to the user remains at a constant delay from the actual time of occurrence.

The server buffers encoded data in its circular buffers 70, 80, 90, for a constant period of time after encoding so that when a client 40 connects to the server 10, 'old' data is available for streaming to the client 40. As the client's decoding buffer 41 fills, the reading points from the circular buffers 70, 80, 90 get nearer to the newest data in these buffers.

The optimal sizing of the circular buffers 70, 80, 90, and the client decoding buffer 41, is preferably such that each can contain the same amount of data, measured in terms of the media presentation time it represents.

The network buffers 120, 130 respectively in the server 10 and client 40 are used by a transport protocol implementing the semi-reliable data connection. Typically, data is retained in the server's network buffer 120 until it, and all earlier data, have been acknowledged to have been received at the client 40. Similarly, data would be removed from the client's network buffer 130 when it, and all earlier data have been successfully received and passed to the decoding buffer 41. Consequently, the server 10, by knowing the data that remains in its own network buffer 120, knows what data has been successfully received by the client 40, within bounds given by the uni-directional transmission delay.

This implies that no feedback from client 40 to server 10, beyond that needed by the transport protocol itself, is needed for the server 10 to know how much data has been received by the client 40, so that it can make decisions about switching between play streams.

The presence of an accumulation of data in the client's decoding buffer 41 provides resilience to a number of network impairments, such as jitter, packet loss and variable throughput. Clearly, it is not possible to recover from all network impairments unless the decoding buffer 41 is dimensioned to contain the whole media content and presentation is delayed until all data is received. As this case is not streaming, but downloading, a strategy to recover from serious network impairments is needed.

At times when the network throughput drops to a level below the encoding rate of the lowest rate play stream for a considerable length of time, the amount of data in the decoding buffer 41 will reduce and will eventually become zero. At this time, presentation to the user will stop. However, circular buffer filling will continue at the server 10. Consequently, when the network recovers to a state in which transmission of the lowest rate play stream is again possible, the next data required by the client 40 will most likely not be in the server's circular buffer 70, 80, 90, as it would have been overwritten by more recent data.

To recover from this situation, the server 10 must restart streaming as if a new connection had been made from the client: it must find a point in the intra stream, and start streaming from it, and then switch through the linking stream into the lowest rate play stream. The effect on the user will be the loss of media from the time that the decoding buffer 41 became empty to the time when the server starts to send the intra stream.

The server 10 will be aware of the client's decoding buffer 41 becoming empty as it is aware of when the client started to decode and of how much data has been successfully received. It will therefore be able to restart at an intra stream picture without the need for a specific message from the client. However, to provide resilience to the system, for example to recover from the effect of different clock speeds in the server and the client, a control message is sent from the client 40 to the server 10 in this situation.

In principle, streaming from file is identical to live streaming. In practice, it is somewhat simpler. There is no need for Circular Buffers 70, 80, 90 as data can be read from file as and when needed. The server 10 however uses the same techniques to fill up the decoding buffer 41 at the client 40 and to switch between play streams. In the case of the decoding buffer 41 becoming empty, there is no need to restart at a later point in the content with an intra stream picture, as presentation can resume when the network throughput again becomes sufficient: the user simply perceives a period in which no media is presented.

Trick modes, such as fast forward, fast reverse and random access, become possible by use of the intra stream.

By writing 'old' data in the circular buffers 70, 80, 90 to file just before being overwritten, the problem described above of the decoding buffer 41 becoming empty, and the user missing content until recovery with an intra stream picture occurs, can be avoided, as data for streaming to the client will always be available: it will have to be read from file rather than from the circular buffers 70, 80, 90.

Such functionality would also allow a client to pause the presented media for an indefinite period of time, and continue streaming afterwards. It would also allow the user to fast forward after such a pause to catch up with the live stream.

An implementation of the transport protocol tested in the above mentioned client-server architecture is based on the ISO TCP transport protocol TPKT, which is described in detail in RFC-2126 by Y. Pouffary, "ISO Transport Service on top of TCP (ITOT)".

Figure 5A:
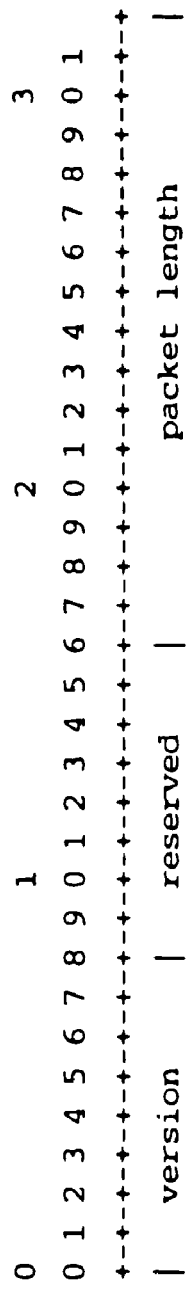
FIGS. 5a and 5b are, respectively, diagrams illustrating standard TKPT transport packet structure and a variation of that structure implemented for the present invention; and, FIGS. 6a-6c are schematic diagrams illustrating aspects of a data structure comprising an audio-visual data stream suitable for storing data for use in the present invention.

The standard TPKT protocol defines a header illustrated in FIG. 5a, followed by a payload. The packet length indicates the combined length of header and payload in octets.

Figure 5B:
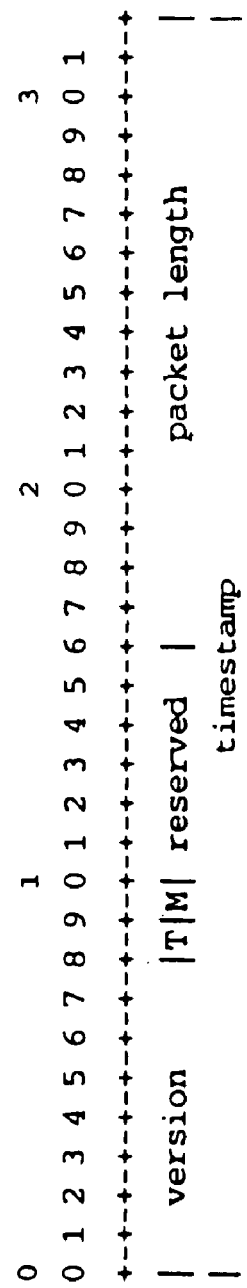

In the implementation used for the present invention, TPKT is extended to have a header, an example of which is illustrated in FIG. 5b, followed by a payload. The packet length indicates the combined length of header, timestamp if present, and payload in octets. T is a bit that indicates whether the timestamp is present, and M is a bit that indicates whether the payload contains audio or video information.

As stated above, timestamps are required for the correct timing of decoding of data. Information embedded in packet headers include the length of the packet, a timestamp for the data in the packet, and a stream identifier.

The stream identifier is provided to allow audio and video to be multiplexed into a single TCP connection. This is to ensure synchronisation of audio and video transmission. If separate TCP connections are used, it is possible that they will respond slightly differently to network characteristics and will achieve different throughputs, which would result eventually in vastly different amounts of data in the client's decoding buffers, measured in terms of presentation time. Although these differences could be managed, the issue is totally avoided by using a single TCP connection and multiplexing audio and video with the same presentation time in neighbouring packets. In fact, adding audio to a video only system simply requires the sending of audio packets at the same time as the associated video: no further control is necessary.

The server 10 attempts to send packets as quickly as possible. Initially, a number of packets are sent back-to-back regardless of the network capacity, as they are simply building up in the server's network buffer 120. When the network buffer 120 becomes full, the rate at which packets can be sent to the network buffer 120 matches the rate of transmission over the network, with the transmission process being limited by blocking calls to the socket send function.

The transmission rate is also limited when the amount of data buffered at the client reaches a threshold, for example 30 seconds. When the client's decoding buffer 41 has this much data, the server 10 restricts the transmission rate to maintain this level of fullness.

Network throughput is estimated by counting bytes that have been sent to the network buffer 120, subtracting from this the size of the network buffer, and dividing by the time since the start of transmission. Shorter term estimates of network throughput are calculated using two counts of bytes transmitted and two measures of the time taken to send them, calculating the throughput from one pair, and switching between then periodically, resetting the pair no longer being used to zero. For example, if resetting occurs every 200 seconds, the network throughput is estimated over a period that varies from 200 seconds immediately after resetting to 40 seconds just before resetting again.

This technique works satisfactorily provided the server 10 is attempting to stream as quickly as possible. But as mentioned above, when the amount of data in the decoding buffer 41 exceeds a threshold, the server 10 restricts its transmission rate to maintain a constant buffer fill. In this case, the network throughput would be estimated as the encoding bit rate of the current play stream. When in this state, the network may be capable of transmitting a higher rate play stream than the one currently being streamed, but the server 10 does not switch because it can not make a true estimate of the network throughput because of its own rate limiting. To escape from this state, the server will periodically ignore the client decoding buffer fullness threshold, and stream at full rate for a given period of time or given amount of data. It records the number of bytes sent to the network buffer 120 and the time taken, starting when the network buffer 120 becomes full, as detected by a blocking call to the send function. It then estimates the achievable throughput, and uses that to determine whether to switch to a higher rate play stream.

As stated earlier, by knowing the data held in its network buffer i20, the server 10 implicitly knows which data has been received by the client 40 and delivered to its decoding buffer 41. This information can then be used to determine when to switch between play streams, and when to invoke the error recovery procedures. However, visibility of the contents and fullness of the server's network buffer 120 in most socket implementations is not supported. In order to monitor the contents of the network buffer 120, a mirror buffer 120*a* is implemented. The mirror buffer 120*a* does not store the actual data sent to the network buffer 120, but instead stores only the number of bytes sent and the timestamp of the data. Knowing the size of the network buffer 120, and assuming it is always full, the server 10 has access to the timestamp of the oldest data in the network buffer 120 via the mirror buffer 120*a*, which is approximately the same as the timestamp of the newest data in the client's decoding buffer 41.

In testing, it has been found that the assumption that the network buffer 120 at the server 10 is always full is correct at most times. This is because the transmission process is controlled to send as quickly as possible to the network buffer 120. If the network buffer 120 becomes less than full, the effect is to underestimate the amount of data at the client 40, which in most cases is safe, as the major problem is seen as exhaustion of data at the client 40 rather than overflow. In practice, the decoding buffer 41 can be dimensioned to be larger than the largest amount of data it needs to store. In any case, if the decoding buffer 41 becomes full the client 40 stops reading from the network buffer 130 which in turn stops the server network buffer 120 from emptying and transmission stops.

To determine the exact amount of data in the client's decoding buffer 41, the server also needs to know the timestamp of the data packet that the client is currently decoding and presenting. The server 10 calculates this using two assumptions: firstly that the client 40 starts decoding immediately after the server 10 sends the first packet; and secondly, that the client's clock does not drift significantly from the server's clock in the duration of streaming.

In practice both assumptions have been found to be valid. The client 40 is designed to start decoding immediately on receipt of data, and so any error on the server's estimated presentation time would result in an underestimate for the amount of data in the decoding buffer 41, which as explained above is not a problem. Drift between the client's and server's clocks during a typical streaming session is most likely to be negligible compared to the amounts of data being buffered. For example, with a difference of 100 parts per million, it would take 10000 seconds, or nearly three hours, for a drift of one second to occur. In the rare case of a large amount of drift accumulating, the client 40 can warn the server 10 by use of a control message, such as the one described earlier that is sent for decoding buffer underflow.

The server 10 initially streams the play stream with the lowest bit rate, to allow the client 40 to decode and present media to the user immediately while also building up the level of data in the decoding buffer 41 to provide resilience to network impairments. If the network has sufficient capacity to support transmission of a higher rate play stream, the server 10 should, at an appropriate moment in time, switch to streaming a higher rate play stream.

There are many possible strategies that could be used to determine when to switch to a higher rate play stream. Preferably, the client 40 should have sufficient data in its decoding buffer 41 to be able to continue decoding and presenting media for a predetermined period of time, say 15 seconds. It is also preferred that network throughput that has been achieved in the recent past, measured over, say, the most recent 60 seconds, should be sufficient to sustain streaming of the play stream to be switched to indefinitely; that is, the recently achieved network throughput rate should be greater than or equal to the bit rate of the play stream. The aim is to avoid frequent switching between streams as this can be more annoying to the user than constant quality at the lower rate.

In order to achieve this aim, it is preferred that the switching down decision includes hysteresis relative to the switching up decision. For example, switching down to the next lower bit rate play stream could be triggered when the client 40 no longer has sufficient data in its decoding buffer 41 to be able to continue decoding and presenting media for a specified period of time, say 8 seconds. In the case of a configuration with three or more play streams, and the currently streamed play stream being the third or even higher rate play stream, this strategy does not result in an immediate drop to the bottom of the hierarchy, as access pictures only occur periodically, and it is hoped that the decoding buffer fullness would recover after a first switch down so that a second switch down would not be necessary.

Figure 6A:
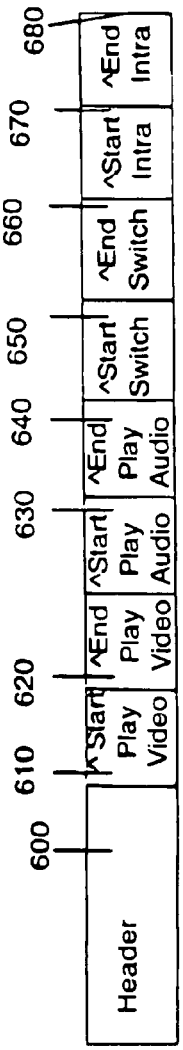
Figure 6B:
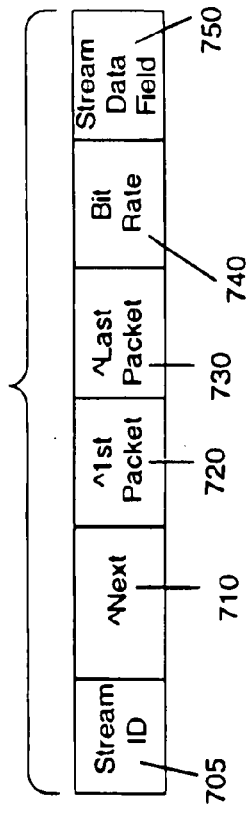
Figure 6C:
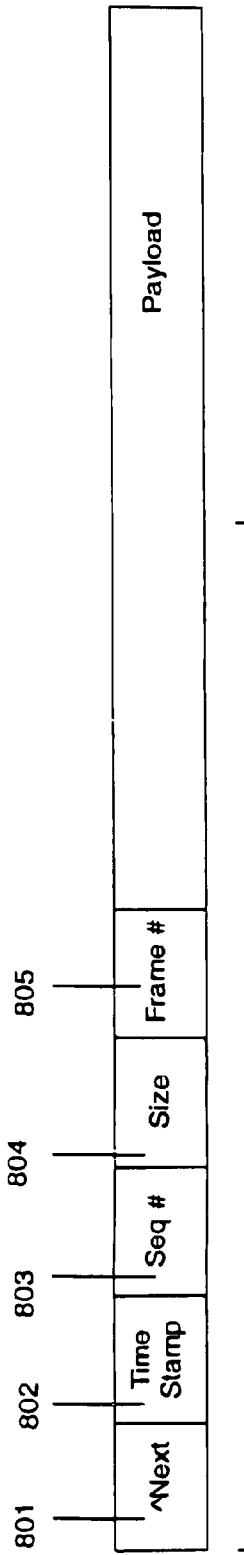

FIGS. 6a-6c are schematic diagrams of aspects of a data structure for storing an audio-visual data source suitable for use in the present invention.

The main data structure shown in FIG. 6a permits the storage in a single file of multiple audio play streams, an Intra video stream, and multiple video Play and Switching streams.

As the audio visual data source created and used in the present invention has a number of encoded streams that could be transmitted at any one time to a client, storage in a conventional sequential file is not possible. For example, in the case of video, a particular source picture may be encoded in each play stream, and may also be encoded in the Intra stream and some or all of the Switching streams.

The file contains a data structure, an example of which is illustrated in FIG. 6a, followed by stream data. The data structure includes a header 600 containing information about the number and type of streams (audio, video, switching etc). For the first and last instances of each type of stream it also includes pointers 610-680 (expressed as offsets from the beginning of the file) to the header for the respective stream.

Each pointer 620-680 points to a stream data structure which includes a stream header 700, containing a pointer 710 to the next stream header of the same type, a pointer 720, 730 to the first and last packets of the stream respectively. Each stream type uses a specific stream header type, however certain elements are common to all stream header types: a stream identification number 705, a pointer 710 to the next stream header of the same type and pointers 720, 730 to the first and last packets of the stream respectively. An example stream header containing only these common elements is illustrated in FIG. 6b. Play and audio stream headers additionally contain the bit rate at which the stream was encoded. Switching stream headers contain the stream identifiers of the play streams from and to which the Switching stream enables switching.

Each stream consists of a sequence of packets, each represented by a packet data structure, an example of which is illustrated in FIG. 6c. Each packet data structure includes a packet header 800 and a payload 810. The header includes data including a pointer 801 to the next packet in the stream, a timestamp 802, a packet sequence number 803, packet size 804, and a frame number 805 (i.e. the sequence number of the video picture or audio frame which the packet, perhaps together with other packets, represents). Switching packets additionally contain the sequence numbers of packets in from- and to- Play streams between which they allow bit rate switching to take place. The switch stream packet header effectively defines a switching point and contains the sequence number of the last packet to be played from the "from" stream before switching and the first to be played from the "to" stream after switching. Sequence numbers begin at 0, and are never negative. The use of pointers to assist in navigation between streams when switching is possible, although this approach has not been followed in this particular embodiment.

The pointers to the last stream data structure and the last packet are useful when appending to a file, as they provide immediate access to the points at which the file must be extended, without the need to search through the whole file.

The complexity of the data structure is a consequence of packets from potentially many streams being interleaved, and of the need to support switching and recovery. Navigation from packet to packet is necessarily by pointers since, in general, packets which are consecutive within a stream will not be stored contiguously within the file. Writing of switching and recovery packets requires that precise details of source and destination packets be recorded. Switching between streams during playback requires firstly the identification of the next available switching packet, followed by playback of the remaining packets from the "from" stream, playback of the switching packets, then the playback of packets from the "to" stream from the appropriate point. Furthermore there must be no appreciable delay when switching between streams.

In tests, both file-based and live streaming scenarios were investigated using the BTCellnet™ GPRS network. A desktop Pentium PC was used to run the encoder and Server. The client was a Compaq iPaq™ connected with via an infra-red link to a Motorola Timeport™ GPRS mobile telephone.

In a video-only configuration, two switching streams were used, with bit rates of 6 kbit/s and 12 kbit/s.

The system performed as expected. Transmission starts with the intra stream and then switches to the 6 kbit/s play stream, where it stays for some time, accumulating data in the client as a result of actually transmitting faster than 6 kbit/s. Then when sufficient data has been accumulated, and the short term average receiving rate is more than 12 kbit/s, it switches to the higher rate play stream.

At times during a lengthy session, occasional switches back to the lower rate play stream occur as a result of reduced network throughput. And very rarely, media presentation is interrupted because of a significant period during which the network could not deliver data to the client.

The overall effect is for most sessions, the user can view continuous media presentation, with occasional changes in quality, but no distortions of the type usually associated with bit errors and packet loss. Only very rarely are complete pauses in media presentation observed as a result of severe network impairments and loss of throughput.

What is claimed is:

1. A data streaming system comprising:
   a server arranged to stream one of a plurality of encoded data streams to a client, each of the plurality of data streams being a representation of a common data source encoded at a different resolution from the other(s) of the plurality of data streams;
   the server comprising a transmitter and a first buffer, the transmitter being arranged to transmit data packets of the encoded data stream to the client via the first buffer and to remove a data packet from the first buffer upon acknowledgement by the client of receipt of the packet, wherein the transmitter includes means arranged to estimate the playing duration represented by the contents of data buffered at the client and switch to transmit another of the plurality of data streams in the event that the estimated playing duration meets predetermined criteria;
   wherein the transmitter monitors the content of the first buffer and the estimate of playing duration is determined in dependence on the contents of the first buffer and on an estimation, made by the transmitter, of the number of packets decoded by the client.

2. A system according to claim 1, wherein the first buffer includes a minor buffer storing data on packets in the first buffer, the transmitter being arranged to monitor the content of the first buffer using the data in the mirror buffer.

3. A system according to claim 1, further comprising a plurality of transmitters, each communicating with a respective client via a respective first buffer to transmit one of the plurality of data streams determined in dependence on respective predetermined criteria.

4. A system according to claim 1, wherein the data stream is encoded video data.

5. A system according to claim 4, wherein the transmitter is arranged to multiplex audio packets and video packets within the transmission of data packets.

6. A system according to claim 5, wherein neighboring audio and video packets represent audio and video information representing audio and video events occurring at the same time.

7. A system according to claim 1, wherein the data stream is encoded audio data.

8. A system according to claim 1, wherein the resolution is an encoding bit rate of the data.

9. A system according to claim 1, wherein the server includes an encoder arranged to accept a data feed and encode the data feed into the plurality of encoded data streams.

10. A system according to claim 9, further comprising a plurality of buffers, wherein the encoder is arranged to output each encoded data stream into a respective one of the plurality of buffers, the transmitter being arranged to obtain data packets for a respective data stream from its respective one of the plurality of buffers.

11. A system according to claim 1, wherein the server includes a file source storing the plurality of encoded data streams.

12. A data streaming system according to claim 1, further comprising a client with a receiving buffer, wherein the client is arranged to store received data packets in the receiving buffer and to acknowledge receipt to the server.

13. A system according to claim 12, wherein the packets include packet sequence data, the client being arranged to request retransmission of non-received packets based on the sequence data, the server being arranged to retransmit a packet from the first buffer upon receipt of a retransmission request.

14. A method of streaming one of a plurality of encoded data streams to a client, each of the plurality of data streams being a representation of a common data source encoded at a different resolution from the other(s) of the plurality of data streams, the method comprising:
  transmitting data packets of the encoded data stream from a transmitter to the client via a first buffer;
  removing a data packet from the first buffer upon acknowledgment by the client of receipt of the packet;
  estimating, at the transmitter, the playing duration represented by the contents of data buffered at the client, in dependence on the contents of the first buffer and on an estimation, made by the transmitter, of the number of packets decoded by the client, and
  switching to transmit another of the plurality of data streams in the event that the estimated playing duration meets predetermined criteria.

15. A method according to claim 14, wherein the plurality of data streams are each encoded at a different bit rate, the method further comprising the step of initially transmitting data packets of the lowest bit rate data stream.

16. A method according to claim 14, wherein the predetermined criteria include an amount of data determined to be buffered at client.

17. A method according to claim 14 wherein the predetermined criteria include one or more network throughput thresholds.

18. A method according to claim 17, wherein network throughput is calculated by:
  counting the number of bytes passed to the first buffer;
  subtracting the size of the first buffer from the counted number of bytes; and
  dividing the result by the time since the start of transmission.

19. A method according to claim 18, further comprising the step of measuring network throughput over more than one interval to determine throughput variation.

20. A method according to claim 18, wherein the predetermined criteria include determination of network throughput sufficient to sustain another of the plurality of the data streams.

21. A method according to claim 18, further comprising transmitting data at a maximum rate irrespective of an amount of data buffered at the client, wherein the predetermined criteria include network throughput determined at the maximum rate.

22. A method according to claim 14, wherein the data streams are encoded as a series of pictures predictively encoded in dependence on the previous pictures in the data stream, the data streams including quantized source access pictures interspersed at predetermined periods in the picture series, and wherein the method of encoding the quantized source access pictures includes:
  encoding picture as a predicted picture; and
  if no information about an area of a picture is indicated in the encoded predicted picture, setting a quantizer index to a fine quantization value when encoding as a quantized source access picture.

23. A tangible non-transitory computer program storage medium containing computer program code which, when executed by a computer, performs the steps of streaming one of a plurality of encoded data streams to a client, each of the plurality of data streams being a representation of a common data source encoded at a different resolution from the other(s) of the plurality of data streams, the steps comprising:
  transmitting data packets of the encoded data stream from a transmitter to the client via a first buffer; removing a data packet from the first buffer upon acknowledgement by the client of the receipt of the packet;
  estimating, at the transmitter, the playing duration represented by the contents of data buffered at the client, in dependence on the contents of the first buffer and on an estimation, made by the transmitter, of the number of packets decoded by the client, and
  switching to transmit another of the plurality of data streams in the event that the estimated playing duration meets predetermined criteria.

24. A method according to claim 14 wherein the data stream is encoded video data.

25. A method according to claim 24, wherein the transmitter multiplexes audio packets and video packets within the transmission of data packets.

26. A method according to claim 25, wherein neighboring audio and video packets represent audio and video information representing audio and video events occurring at the same time.

* * * * *